United States Patent [19]

Puckett et al.

[11] Patent Number: 5,393,335
[45] Date of Patent: Feb. 28, 1995

[54] STARCH-OIL SIZING FOR GLASS FIBERS

[75] Inventors: Garry D. Puckett, Salisbury, N.C.; Ernest L. Lawton, Allison Park; Xiang Wu, Gibsonia, both of Pa.

[73] Assignee: PPG Industries, Inc., Pittsburgh, Pa.

[21] Appl. No.: 52,323

[22] Filed: Apr. 23, 1993

[51] Int. Cl.$^6$ .......................................... C09D 103/02
[52] U.S. Cl. .................... 106/211; 106/212; 106/213; 106/287.11; 428/391; 428/429
[58] Field of Search ........... 106/213, 211, 212, 287.11; 65/3.1; 428/391, 429

[56] References Cited

U.S. PATENT DOCUMENTS

| 2,200,815 | 5/1940 | Ackley | 548/349.1 |
|---|---|---|---|
| 2,267,965 | 12/1941 | Wilson | 548/350.1 |
| 2,268,273 | 12/1941 | Wilkes et al. | 428/274 |
| 2,353,837 | 7/1944 | Loane et al. | 252/46.7 |
| 2,728,972 | 1/1956 | Drummond et al. | 65/3.4 |
| 3,597,265 | 8/1971 | Mecklenborg et al. | 528/424 |
| 3,644,855 | 5/1972 | Morrison et al. | 106/212 |
| 3,793,065 | 2/1974 | Morrison et al. | 106/212 |
| 3,928,666 | 12/1975 | Morrison et al. | 106/212 |
| 4,221,602 | 9/1980 | Walser | 106/212 |
| 4,233,046 | 11/1980 | Walser | 106/212 |
| 4,259,190 | 3/1981 | Fahey | 428/268 |
| 4,397,913 | 8/1983 | Fahey | 106/212 |
| 4,615,739 | 10/1986 | Clark et al. | 106/212 |
| 4,681,805 | 7/1987 | Puckett | 428/391 |
| 5,120,363 | 6/1992 | Puckett | 106/213 |

FOREIGN PATENT DOCUMENTS 50012394 6/1973 Japan .................... 106/211

Primary Examiner—Anthony Green
Attorney, Agent, or Firm—James B. Robinson; Kenneth J. Stachel; Ann Marie Odorski

[57] ABSTRACT

An aqueous starch-oil sizing composition is provided which produces improved processability in woven and non-woven applications. The sizing has low viscosity starch, a lubricant which is a mixture of oil and wax where the wax is present in an amount of at least twice the oil, cationic lubricants, and a humectant. The size also includes an organo-functional silane coupling agent such as gamma-glycidoxypropyltrimethoxy silane which may be hydrolyzed. Emulsifiers, defoamers, and biocides may be present. Strands of glass fiber which have been treated with this size have generally shown a reduced tendency to shed the size from the strands, a reduction in the buildup of broken filaments or "fuzz" on processing equipment and reduced strand breakage.

14 Claims, No Drawings

STARCH-OIL SIZING FOR GLASS FIBERS

BACKGROUND OF THE INVENTION

The present invention is directed to a starch-oil type sizing composition and glass fibers that have been treated with the composition. The term "starch-oil sizing" is a term commonly used in the art and means a treatment for fibers having at least one starch along with oil, wax or other nonionic lubricants and mixtures thereof, which is applied to the glass fibers to impart certain properties as discussed below.

Glass fibers are produced by flowing molten glass via gravity through a multitude of small openings in a precious metal device called a bushing. Typical glass fibers are described in *The Manufacturing Technology of Continuous Glass Fibres*, by K. L. Loewenstein, Elsevier Scientific Publishing, 1973, at page 29, Library of Congress Catalog Card No. 72-97429. Among the commonly used glass fibers are, for example, those known as "E glass", "S glass", "D glass" and are typically between 3 and 30 microns in diameter.

In close proximity to their formation, these fibers are treated with a sizing composition which serves to protect the fibers from abrasion arising from contact with each other or with processing machinery. The aqueous sizing composition is applied by sprayers, rollers, belts or the like. The sized glass fibers are gathered into bundles or strands comprising a plurality of individual fibers, generally from 200 to more than 3000. The sized glass fibers generally have between about 0.05 and 5 percent of sizing composition based on the weight of the glass fiber.

After their formation and treatment, the strands are wound into a spool or "forming package". The forming packages are usually dried in either an oven or at room temperature to remove the moisture from the fibers. For certain uses, the fibers are then typically wound onto a bobbin via conventional textile twisting techniques such as a twist frame.

One function of a sizing composition is to improve the performance of the fibers during further processing. Such further processing can include textile applications such as weaving of the fibers, which involves removing the fiber from the bobbin and guiding the fiber over or through a series of guide bars and other points of physical contact where wear could occur. Manifestation of such wear can be seen in the buildup of broken filaments or "fuzz" on the contact points, an increase in static electricity, poor quality of the woven product, as well as the shedding of the sizing from the fibers, or the breaking of the strand itself during weaving. Another function of a sizing is to impart to fabrics which are woven from the treated fibers a surface which is smooth and which has few visible defects.

The strands of treated glass fiber may also be used in non-woven applications such as the manufacture of fiber glass reinforced tape. In this application the strand can undergo abrasion and wear similar to that experienced in the woven applications as it is removed from the bobbin and processed.

An example of a starch-oil sizing is disclosed in U.S. Pat. No. 4,681,805 to Puckett. The sizing disclosed has a poly(oxypropylene) polyol as the sole starch film-forming modifier in order to reduce gummy deposits on equipment.

It is an object of this invention to produce strands of glass fiber having a moisture-reduced residue of a starch-oil type sizing composition which results in reduced fuzz production, reduced shedding, greater strand integrity and which produces a smooth woven surface with few visible defects.

SUMMARY OF THE INVENTION

The objects of the invention are accomplished by treating glass fibers with an aqueous starch-oil composition comprising a starch consisting of a single low viscosity starch and other components. The starch present is a single low viscosity starch and the "oil" is a nonionic lubricant mixture of oil and wax where the wax is present in an amount of at least twice the amount of the oil. Other components of the size in addition to the water, starch and nonionic lubricant are a silane coupling agent, cationic lubricants and a humectant. The composition may optionally contain emulsifiers, defoamers, biocides or any other conventional ingredients known to those skilled in the art.

DETAILED DESCRIPTION OF THE INVENTION

Among the low viscosity starches which may be used in the composition of the invention are amylose-containing starches derived from any starch sources including corn, wheat, potato, tapioca, waxy maize, sago, rice, hybrid starches, etc. Starch components having a high amylose content, e.g. 50 or more percent by weight, are derived from either corn starch or a hybrid corn starch, while the starch components having a low amylose content, e.g. 20 to 30 percent by weight are usually derived from either potato or cationic, phosphatized, ethoxylated or etherified corn starch. Any of these may be used in the invention; the most important consideration in choosing the starch to be used in this invention being that it has a low viscosity as that term is understood in the art. A convenient definition of "low viscosity" is a starch with a post-cook viscosity of 100 centipoise or less at 100° F. with a 6 percent solids level. The viscosity testing is performed at 12 rpm with a No. 61 spindle on a Brookfield Viscometer Model No. DV2+.

A non-limiting example of a commercially available starch suitable for use in the present invention is Kollotex 1250, sold by AVEBE b.a. A particularly suitable material, sold by National Starch under the name Hi-set 369, is a propylene oxide modified corn starch with an amylose/amylopectin ratio of 55/45. The starch should be completely cooked and present in an amount of between about 40 and 65 weight percent of the sizing on a non-aqueous basis.

Examples of nonionic lubricants useful in the present invention include waxes and vegetable oils hydrogenated to various degrees, such as cotton seed oil, corn oil, soybean oil, etc. The oil used in the preferred embodiment is a partially hydrogenated soybean oil available commercially as Eclipse 102 oil. The oil should be present in an amount of between about 5 and 15 weight percent of the sizing on a non-aqueous basis. Any wax known to those skilled in the art for use in compositions for the treatment of glass fibers may be used, examples of which are paraffin wax, animal waxes, mineral waxes, petroleum derivative waxes, and synthetic waxes. The preferred wax in this invention is paraffin wax. The amount of wax should be an amount of between about 10 and 30 weight percent of the sizing on a non-aqueous basis and the total of the nonionic lubricants should be an amount of between about 15 and 45 weight percent of the sizing on a non-aqueous basis. The wax must be present in an amount at least twice that of the oil in order to impart the improved properties desired, i.e. a lower broken filament rate and lower defect rates than sizes not having this ratio.

The composition also contains a second lubricant which can be any cationic lubricant known in the art. While essentially any cationic lubricant known in the art may be used, the preferred cationic lubricants are partially amidated polyalkylene imines and alkyl imidazoline derivatives.

Partially amidated polyalkylene imines are those such as described in U.S. Pat. No. 3,597,265. The partially amidated polyalkylene imine lubricants usually have a residual amine value of from about 200 to 800 and are reaction products of a mixture of $C_2$ to about $C_{18}$ fatty acids with a polyethylene imine having a molecular weight of from about 800 to about 50,000. The amines useful for forming the fatty acid salt are tertiary amines of substantially low molecular weight, for example, the alkyl groups attached to the nitrogen atom should be between 1 and 6 carbon atoms. Examples of such amine salts of a fatty acid are Alubraspin TM 226 lubricant available from PPG Industries, Inc. and the products available from Henkel Corp. designated Emery ® 6717, 4046D, and 6760 lubricants. The commercial products have 100 percent active ingredients.

Alkyl imidazoline derivatives include compounds of the class n-alkyl-N-amido-alkyl imidazolines, which may be formed by causing fatty acids or carboxylic acids to react with polyalkylene polyamines under conditions which produce ring closure. The reaction of tetraethylenepentamine with stearic acid is exemplary of such a reaction and these imidazolines are described in U.S. Pat. No. 2,200,815. Other imidazolines are described in U.S. Pat. Nos. 2,267,965; 2,268,273; and 2,353,837. Suitable imidazolines are available under the name Cation-X ® lubricant from Lyndal Chemical Co. and as Alubraspin TM 261-121 lubricant from PPG Industries, Inc. The commercial products have approximately 36 percent active ingredients.

The cationic lubricant is present in an amount between about 1 and 10 weight percent of the sizing on a non-aqueous, active ingredient basis. The lubricant in the preferred embodiment is a mixture of Alubraspin TM 226 and Alubraspin TM 261-121 lubricants present in approximately equal amounts on a non-aqueous, active ingredients basis.

Any humectant may be used in the present invention. Examples include polyalkylene polyols and polyoxyalkylene polyols, the preferred humectants being polyethylene glycols, examples of which are MACOL E-300 available from PPG Industries, Inc., and those available from Union Carbide Corp. under the product designations Carbowax 300 and Carbowax 400, having approximate molecular weights of 300,000 and 400,000, respectively. The amount of humectant present is between about 2 and 15 weight percent of the sizing on a non-aqueous basis.

The silanes useful in this invention are organo-functional silane compounds used as coupling agents between the predominantly organic size and the inorganic glass, and any silane coupling agent known in the art may be used. Examples of organo-functional silane coupling agents useful in this invention are amino-functional silanes and epoxy-functional silanes. Commercially available silanes, such as gamma-aminopropyltriethoxy silane and gamma-glycidoxypropyltrimethoxy silane, are useful and are readily available from Union Carbide Corporation as A-1100 and A-187, respectively, and from Dow Chemical as Z-6011 and Z-6040, respectively. The epoxy functional silanes ape preferred; the silane may be hydrolyzed to some degree before use by reacting it with an effective amount of a suitable carboxylic acid such as acetic acid. The amount of the silane coupling agent present is between about 0.5 and 8 weight percent of the sizing on a non-aqueous basis.

Since the sizing is aqueous, it is necessary to emulsify, disperse or otherwise solubilize the wax and oil. This may be accomplished through mechanical means or through the use of an emulsifier and any emulsifier known to those skilled in the art to be useful in emulsifying waxes and oils in water may be used. Examples of particularly useful emulsifiers are those which are nonionic and have a hydrophilic/lipophilic balance (HLB) in the range of about 8 to 20 or any mixture with an HLB in this range. A suitable nonionic emulsifier is TMAZ 81, available from PPG Industries, Inc., which is sorbitan mono-oleate which is an ethylene oxide derivative of sorbitol ester with an HLB of about 10. Another suitable emulsifier is commercially available as Tween 81. The amount of emulsifier to be used is dictated by the types of lubricants used and the equipment used to mix them, but if used is generally between about 1 and 10 weight percent of the sizing on a non-aqueous basis.

The sizing may contain a small amount of defoamer if foaming becomes a problem, particularly during the mixing of the sizing. The defoamer used in the preferred embodiment is MAZU DF 136 available commercially from PPG Industries, Inc.

A biocide may also be added to the sizing to control organic growth, particularly if the sizing will not be used immediately. The biocide used in the preferred embodiment is CL-2141, commercially available from ChemTreat of Ashland, Va.

In the preparation of the sizing composition, the components are usually mixed with water and prepared separately before being added to the main mixture. For example, the starch may be mixed together with water and then cooked by any method known to those skilled in the art. Other components are prepared separately and then added to the mixture of starch and water.

The total amount of water in the final composition should normally be sufficient to enable the composition to be effectively applied to glass fibers using conventional equipment and techniques. This usually results in a solids level of less than 15 percent in the final sizing composition.

The starch preparation method of the preferred embodiment uses a jet cooker which injects steam directly into a starch and water mixture as it travels in a pipe. The downstream temperature is controlled at a specific value by the regulation of the addition rate of steam to the mixture. The mixture is held at the cooking temperature for a particular time which allows the cooking to advance to completion. Cooking is stopped by cooling the mixture.

The wax, oil and emulsifier may be mixed with demineralized water and emulsified by any suitable means. One method of emulsification is by circulating the mixture through a high pressure homogenizing pump and returning it to the same vessel. By this method, the quality of the emulsion may be monitored until the mixture forms an emulsion with particles within a desired range. Another method of emulsifying the mixture is to agitate it in a tank using a high shear mixer such as an Eppenbach mixer. The emulsion is then added to the starch mixture.

The lubricants may be mixed with water and added to the mixture. The silane may be mixed with water and acetic acid for hydrolysis and then added, while the humectant and other ingredients may be added directly to the mixture.

The sizing composition of this invention may be prepared by any other suitable method known to those skilled in the art and applied to glass fibers using conventional techniques. The sized fibers can be gathered together to form strands by any method known to those skilled in the art and then dried in an oven or at room temperature such that the moisture content of the sizing on the fibers is reduced to less than 15 weight percent of the glass and sizing.

Table 1 describes several specific examples of the sizing composition of this invention which were prepared from the ingredients listed to produce about 1,000 gallons of the sizing mixture. The starch of Example A is Hi-set 369 and the starch of Example B is Kollotex 1250.

TABLE 1

| Ingredient | A Pounds | B Pounds |
| --- | --- | --- |
| Low viscosity starch | 284 | 312 |
| Eclipse 102 oil | 43 | 43 |
| Paraffin wax | 100 | 100 |
| Alubraspin TM 261-121 lubricant | 40 | 40 |
| Alubraspin TM 226 lubricant | 11 | 10 |
| MACOL E-300 humectant | 36 | 36 |
| A-187 silane | 18 | 11 |
| Acetic acid | 800 ml | 500 ml |
| TMAZ 81 emulsifier | 18 | 27 |
| MAZU DF 136 defoamer | 2000 ml | 2000 ml |
| CL-2141 biocide | 80 ml | 80 ml |

In the examples, the aqueous composition was prepared by adding the starch to an agitated mixing or slurry tank to which was previously added about 380 gallons of demineralized water.

Cooking of the starch took place by pumping the starch mixture from the slurry tank through a jet cooker in which steam was injected directly into the starch mixture. The steam addition rate was controlled to give an exit temperature of about 124° C. and the exit pressure was controlled at approximately 27 psig. The residence or dwell time of the starch mixture at the cooking temperature was about 11 seconds to cook it and it then was cooled by passing it through a water cooled heat exchanger controlled to yield an exit temperature of about 82° C. The starch mixture was then directed to a main mix tank. Demineralized water in an amount of about 100 gallons was used to wash the slurry tank to thoroughly remove the raw starch from the tank as well as to flush any remaining starch from the jet cooker. This wash water was flushed into the main mix tank also. In addition to the above method, any other method of cooking starch, such as open kettle cooking, known to those skilled in the art may be used to obtain the same degree of cooking as this method.

The paraffin wax was then added to a separate emulsion tank and the temperature set at about 80° C. After the specified temperature had been reached and the wax melted, the Eclipse 102 oil and the TMAZ 81 emulsifier were added. About 50 gallons of hot (approximately 80° C.) demineralized water were added and the mixture was agitated. Once the ingredients had been emulsified to the point where the particle size was in the range of about 1 to 3 microns, the pump discharge was directed to the main mix tank.

To another tank, about 30 gallons of warm (approximately 63° C.) demineralized water were added and agitation begun. The Alubraspin TM 261-121 alkylimidazoline derivative lubricant was then added and agitation continued until it dissolved, at which point the mixture was transferred to the main mix tank.

To another tank, about 30 gallons of warm demineralized water were added and agitation begun. The Alubraspin TM 226 partially amidated polyalkyleneimine lubricant was added and then the mixture was agitated for about 10 minutes. The mixture was then transferred to the main mix tank.

The MAZU DF 136 defoamer was added directly to the main mix tank as was the MACOL E-300 humectant.

To another tank, about 25 gallons of room temperature (approximately 25° C.) demineralized water were added and agitation begun. The indicated amount of acetic acid was then added. The A-187 epoxy silane coupling agent was added at a rate not exceeding 1 gpm and the solution was agitated until it cleared—at least 5 minutes. The mixture was then added to the main mix tank.

The CL-2141 biocide was the last ingredient and was added to the main mix tank.

Warm demineralized water was then added to the main mix tank in an amount sufficient to bring the total amount of sizing prepared to about 1000 gallons with a preferred solids level of about 6 percent, and agitation continued for at least an additional 15 minutes.

The sizing composition of the examples were applied to fibers immediately after formation below the bushing using an applicator. An example of an applicator suitable for this application is shown in U.S. Pat. No. 2,728,972. After the application of the sizing, the fibers were gathered together to form a strand composed of multiple fibers. The strands were then wound onto a forming package on a winder which rotates at a speed in the range of about between 4,000 and 6,000 rpm.

Glass fibers sized with the composition of this invention have shown generally good performance in lowering fuzz production and in lowering the visible defect rate of woven fabric when compared to other commercially available glass fibers.

Therefore, we claim:

1. An aqueous sizing composition for glass fibers comprising, in addition to water:
   a single low viscosity starch having a post-cook viscosity of 100 centipoise or less at 100° F. at a 6 percent solids level;
   a nonionic lubricant which is a mixture of oil and wax wherein the wax is present in an amount of at least twice the amount of the oil on a weight basis;
   a cationic lubricant;
   a humectant; and
   at least one silane coupling agent.

2. The aqueous sizing composition of claim 1 further comprising at least one emulsifier in an effective amount to produce an emulsion in water of said nonionic lubricant.

3. The aqueous sizing composition of claim 2 wherein the emulsifier has an HLB of about between 8 and 20 and is an ethylene oxide derivative of sorbitol ester.

4. The aqueous sizing composition of claim 1 wherein the nonionic lubricant is a mixture of partially hydrogenated soybean oil and paraffin wax.

5. The aqueous sizing composition of claim 1 wherein the cationic lubricant is a mixture of two cationic components which are partially amidated polyalkylene imines and alkylimidazoline derivatives.

6. The aqueous sizing composition of claim 5 wherein said lubricant mixture has about an equal amount of each cationic component based on active ingredients.

7. The aqueous sizing composition of claim 1 further comprising a biocide in an amount sufficient to inhibit organic growth in said sizing composition.

8. The aqueous sizing composition of claim 1 wherein the humectant is polyethylene glycol.

9. The aqueous sizing composition of claim 1 wherein the silane coupling agent is gamma-glycidoxypropyl-trimethoxy silane.

10. The aqueous sizing composition of claim 9 further comprising a carboxylic acid in an amount sufficient to hydrolyze said silane.

11. The aqueous sizing composition of claim 1 further comprising a defoamer in an effective amount to reduce foaming during mixing of the aqueous sizing composition.

12. The aqueous sizing composition of claim 1 which is present on glass fibers in a moisture reduced amount of between 0.5 and 5 weight percent of the glass as measured on a loss on ignition basis.

13. An aqueous sizing composition for glass fibers comprising, in addition to water:

between about 40 and 65 weight percent on a non-aqueous basis of a single low viscosity starch having a post-cook viscosity of 100 centipoise or less at 100° F. at a 6 percent solids level;

between about 15 and 45 weight percent on a non-aqueous basis of a nonionic lubricant which is a mixture of partially hydrogenated soybean oil and paraffin was wherein the wax is present in an amount of at least twice the amount of the oil on a weight basis;

between about 1 and 10 weight percent on a non-aqueous, active ingredient basis, of a cationic lubricant;

between about 1 and about 10 weight percent on a non-aqueous basis of an emulsifier which has an HLB of about between 8 and 20 and is an ethylene oxide derivative of sorbitol ester;

between about 2 and 15 weight percent on a non-aqueous basis of a humectant which is polyethylene glycol; and between about 0.5 and 8 weight percent on a non-aqueous basis of at least one coupling agent selected from the group consisting of hydrolyzed silanes and non-hydrolyzed silanes and mixtures thereof.

14. The aqueous sizing composition of claim 13 wherein the cationic lubricant is a mixture of partially amidated polyalkylene imines and alkylimidazoline derivatives which are present in approximately equal amounts based on active ingredients.

* * * * *

UNITED STATES PATENT AND TRADEMARK OFFICE
CERTIFICATE OF CORRECTION

PATENT NO. : 5,393,335
DATED : February 28, 1995
INVENTOR(S) : Garry D. Puckett, Ernest L. Lawton and Xiang Wu It is certified that error appears in the above-indentified patent and that said Letters Patent is hereby corrected as shown below:

Claim 13, column 8, line 8, after paraffin, delete "was"

and insert --wax--.

Signed and Sealed this

Eighteenth Day of June, 1996

*Attest:*

BRUCE LEHMAN

*Attesting Officer*     *Commissioner of Patents and Trademarks*